United States Patent
Lee et al.

(10) Patent No.: US 6,426,386 B2
(45) Date of Patent: Jul. 30, 2002

(54) MELT PROCESSIBLE FLUOROPOLYMER COMPOSITION

(75) Inventors: Jeong Chang Lee; Shosaku Kondo; Hajime Sato, all of Shimizu (JP)

(73) Assignee: DuPont-Mitsui Fluorochemicals Co. Ltd., Tokyo (JP)

( * ) Notice: Subject to any disclaimer, the term of this patent is extended or adjusted under 35 U.S.C. 154(b) by 2 days.

(21) Appl. No.: 09/767,580

(22) Filed: Jan. 23, 2001

(30) Foreign Application Priority Data

Feb. 2, 2000 (JP) ........................................ 2000-025458

(51) Int. Cl.⁷ ............................ C08L 27/12; C08L 27/18
(52) U.S. Cl. .................................... 525/199; 525/200
(58) Field of Search ................................. 525/199, 200

(56) References Cited

U.S. PATENT DOCUMENTS

| | | |
|---|---|---|
| 3,051,683 A | 8/1962 | Mallouk |
| 3,484,503 A | 12/1969 | Magner et al. |
| 5,041,500 A | 8/1991 | Ishiwari et al. |
| 5,179,167 A | 1/1993 | Ishiwari et al. |

FOREIGN PATENT DOCUMENTS

| | | |
|---|---|---|
| EP | 0 225 792 A2 | 6/1987 |
| EP | 0 789 039 A | 8/1997 |
| EP | 1 000 976 A1 | 5/2000 |
| WO | WO99/62999 | 5/1999 |

OTHER PUBLICATIONS

Pucciarello, et al., "Phase Behavior of Crystalline Blends of Poly(tetrafluoroethylene) and of Random Fluorinated Copolymers of Tetrafluoroethylene", Journal of Polymer Science: Part B: Polymer Physics, vol. 37, 679–689 (1999).
J. Runt, et al., "Chrstalline Homopolymer–Copolymer Blends: Poly(tetrafluoroethylene)–Poly-(tetrafluoroethylene–Co–Perfluoroalkylvinyl Ether)", Macromolecules, vol. 28, 2781–2786 (1995).

*Primary Examiner*—Nathan M. Nutter

(57) ABSTRACT

A melt processible fluoropolymer composition comprising a copolymer of tetrafluoroethylene with a perfluoro(alkyl vinyl ether), which copolymer is a mixture of a first fluorocarbon resin copolymer in which the alkyl group of the perfluoro(alkyl vinyl ether) has at least 3 carbons, and a second fluorocarbon resin copolymer in which the alkyl group of the perfluoro(alkyl vinyl ether) has 1 and/or 2 carbons, and the components of the blend are miscible in the amorphous regions and sometimes in the crystalling regions.

8 Claims, 2 Drawing Sheets

MELT PROCESSIBLE FLUOROPOLYMER COMPOSITION

FIELD OF THE INVENTION

This invention is in the field of blends of copolymers of tetrafluoroethylene and perfluoro(alkyl vinyl ether) that are miscible in amorphous regions and can be miscible in crystalline regions as well.

BACKGROUND OF THE INVENTION

The melting points and crystallization temperatures of tetrafluoroethylene-perfluoro(alkyl vinyl ether) copolymers (known as TFE/PAVE or PFA) and tetrafluoroethylene-hexafluoropropylene copolymers (FEP) are strongly influenced by the amount of PAVE or HFP comonomer in the copolymer. An increase in the amount of comonomer in the copolymer results in a decrease in the polymer melting point.

PAVE comonomers include perfluoro(propyl vinyl ether) (PPVE), and perfluoro(ethyl vinyl ether) (PEVE), and perfluoro(methyl vinyl ether) (PMVE). In comparison with TFE/PPVE, the copolymers TFE/PEVE and TFE/PMVE have certain advantages. For example, the PEVE and PMVE comonomers polymerize more rapidly than PPVE, and polymerization is easier to control. Furthermore, PEVE and PMVE are distributed more uniformly in the polymer molecules. These features make them preferable to PPVE when higher comonomer content is needed, as for example, when increased copolymer flex life is desired. However, with higher comonomer content than prior-art PPVE-containing PFAs, the TFE/PEVE and TFE/PMVE polymers have lower melting points and lower maximum service temperatures than TFE/PPVE PFAs. As a result, articles made from them have lower use temperatures.

Examples are known in which the physical properties of a fluoropolymer are optimized by admixture of other fluoropolymers. U.S. Pat. No. 5,041,500 discloses heterogeneous blends of FEP with TFE/PPVE. U.S. Pat. No. 5,179,167 discloses blending of low and high molecular weight FEP or TFE/PPVE. Attempts have been made to improve the blend properties by more uniform and intimate mixing of the components: *Macromolecules* vol. 28, p. 2781 (1995); *Journal of Polymer Science*: Polymer Physics vol. 37, p. 679 (1999)). Blends of polytetrafluoroethylene (PTFE) with TFE/PPVE and of FEP with TFE/PMVE were found to cocrystallize if the melt blends were rapidly cooled with liquid nitrogen. However, under cooling conditions characteristic of normal polymer melt processing, the polymers of the blends crystallized separately, as shown by their separate melting points in the blend.

There is a need for fluoropolymer blend compositions that remain intimately blended after cooling, as evidenced by single melting points and single α-transition temperatures.

SUMMARY OF THE INVENTION

It has been discovered that different melt processible copolymers of tetrafluoroethylene and perfluoro(alkyl vinyl ether) can be mixed together to produce a fluoropolymer composition in which the components are miscible on a molecular level. In greater detail, the melt processible fluoropolymer composition of the present invention comprises:
a) a first copolymer of tetrafluoroethylene and perfluoro(alkyl vinyl ether) wherein the alkyl group of the perfluoro(alkyl vinyl ether) has at least 3 carbons, and b) a second copolymer of tetrafluoroethylene and perfluoro(alkyl vinyl ether) wherein the alkyl group of the perfluoro(alkyl vinyl ether) has 1 and/or 2 carbons, wherein each said first copolymer and said second copolymer has crystalline and amorphous regions, at least the amorphous regions of said first copolymer and second copolymer being miscible with one another as revealed by said composition exhibiting a single α-transition temperature.

DETAILED DESCRIPTION

Figure 1:
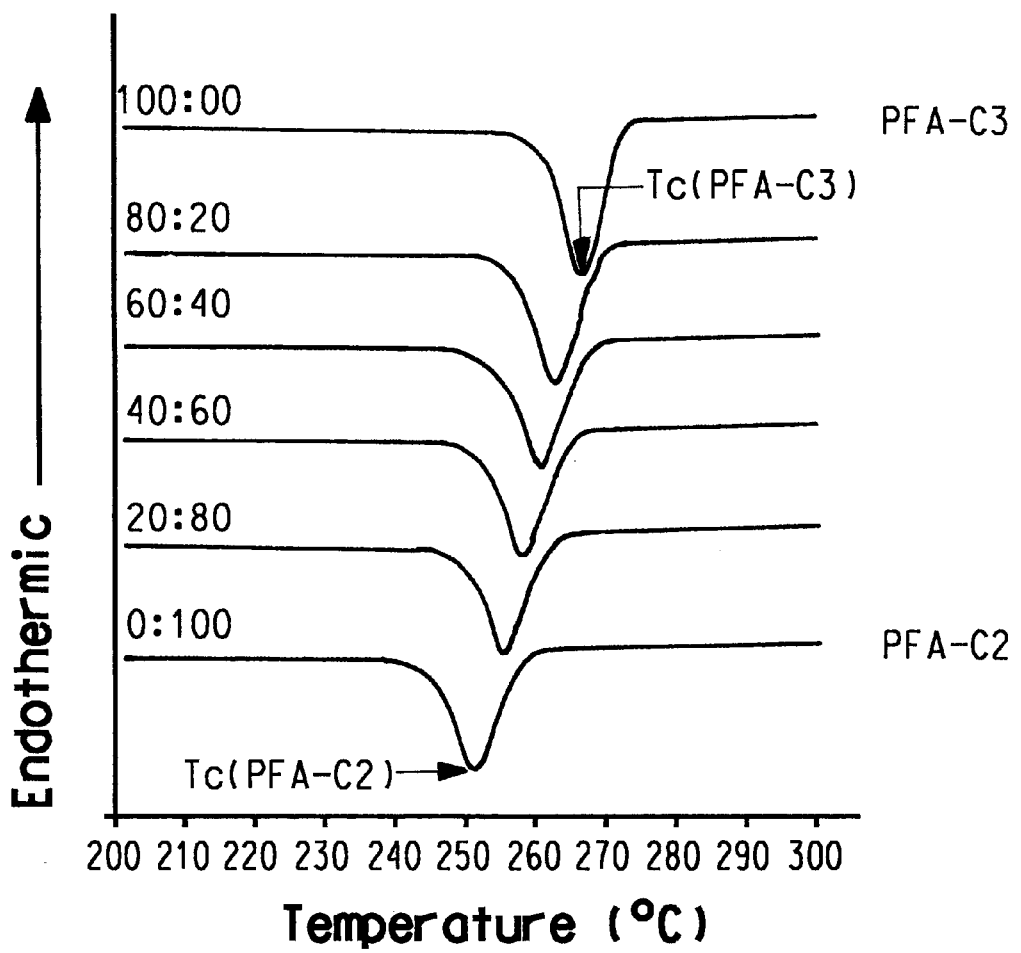
FIG. 1 is a graph showing the crystallization temperatures (Tc) of PFA-C3/PFA-C2 blends and components. The cooling rate is 70° C./minute.

Melt processible fluoropolymers are the general subject of this patent. By melt processible is meant that the polymer can be processed, that is fabricated into shaped articles such as films, fibers, tubes, wire coating, and the like, by conventional melt-extruding means. Melt processible polymers have melt viscosities at their processing temperatures of no more than about $1 \times 10^6$ Pa·s. Preferably the viscosity is in the range of about $1 \times 10^2$ to $1 \times 10^6$ Pa·s, more preferably in the range of about $1 \times 10^3$ to $1 \times 10^5$ Pa·s. Fluoropolymers are defined herein as polymers in which at least some of the constituent monomers are fluoromonomers. Fluoromonomers are fluoroolefins, which are defined herein as olefins in which at least one of the substituents on the doubly bonded carbon atoms is a fluorine atom. For the purposes of this patent, fluoropolymers are further defined as having at least about 35% by weight fluorine.

The fluoropolymers of this invention have both crystalline and non-crystalline (also known as amorphous) regions or phases. The crystalline region is such that on analysis using differential scanning calorimetry (DSC), the polymer has an observable melting point and a heat of melting, sometimes referred to as the heat of fusion, of at least about 3 J/g.

It has been discovered that when TFE/PPVE is blended with TFE/PEVE and/or TFE/PMVE, the components are miscible at the molecular level in the amorphous region and can be miscible in the crystalline region as well, which means that they form a uniform and intimate mixture that is maintained after melt processing regardless of how the molten blend is cooled to ambient temperature, that is, to about 15° C. to 20° C.

It is therefore an object of the invention to provide melt processible fluoropolymer compositions in which the constituent components are miscible in amorphous regions. As will be described herein, the constituent components can also be miscible in crystalline regions as well. More specifically, the object is to provide such compositions that have physical properties superior to those of a single PFA. The object of the invention is most particularly to provide melt processible fluoropolymer compositions which have an improved flex life and a higher melting point than the lower-melting PFA component, and which confer upon melt-fabricated articles made therefrom a higher maximum service temperature.

The TFE/PAVE copolymer used in the invention is composed of a first copolymer (A) (hereinafter referred to as "PFA-C3") in which the alkyl group of the PAVE has at least 3 carbons, and preferably from 3 to 10 carbons, and which more preferably is PPVE; and a second copolymer (B) in which the alkyl group of the PAVE is methyl (PFA-C1) and/or ethyl (PFA-C2). One or more of the first copolymer (A) and one or more of the second copolymer (B) may be used. Compositions of this type include blends of PFA-C3 in copolymer (A) with blends of PFA-C1 and PFA-C2 in copolymer (B). Use can also be made of a copolymer containing two or more perfluoro(alkyl vinyl ethers), each having different alkyl groups. For example, TFE/PPVE might be blended with the terpolymer TFE/PEVE/PMVE.

PFA-C3 is preferably a copolymer having a PAVE content of about 0.5 to about 8% by weight, preferably about 2 to about 6%, and more preferably about 3 to about 5%. PFA-C1 and PFA-C2 are each preferably copolymers having PAVE contents of about 1 to about 25% by weight, and more preferably about 1 to about 20% by weight. If the PAVE content of PFA-C1 or PFA-C2 differs too much from the PAVE content of PFA-C3, the copolymers may be immiscible in the crystalline regions. To obtain a composition in which the constituent copolymers are miscible in the crystalline regions, it is preferable that PFA-C1 and PFA-C2 differ in PAVE content from PFA-C3 by no more than about 10% by weight, preferably by no more than about 8%, and more preferably by no more than about 6%. The PAVE content (weight %) of PFA-C3 will preferably be less than the PAVE content of PFA-C2 or of PFA-C1, or the admixture of both. As will be described in the examples, when PFA-C3 copolymer having a PPVE content of about 4% by weight or less is used, the admixture of PFA-C1 or PFA-C2 copolymer having a PMVE or PEVE content of about 1 to about 12% by weight gives a composition in which the constituent copolymers are miscible in both crystalline and amorphous regions. However, the admixture of PFA-C1 or PFA-C2 copolymer having a PMVE or PEVE content of more than about 12 to 25% by weight shows phase separation in the crystalline regions during cooling, so that the components are miscible only in amorphous regions in the cooled blend.

When the components of the cooled blend are miscible in the amorphous region, a single α-transition temperature, as determined with a dynamic mechanical analyzer (DMA), appears between the temperatures of the α-transitions of the blend components. When the components of the cooled blend are miscible in the crystalline region, the melting point (the principal endothermic peak that appears as the solid blend is heated to melt it) and crystallization temperature (the principal exothermic peak that appears as the molten blend is cooled), as determined with a differential scanning calorimeter (DSC), each appears as a single temperature between the respective values of the components of the mixture. There are cases where the compositions of the invention are miscible only in amorphous regions and cases where miscibility extends to both amorphous regions and crystalline regions. The latter condition is preferred for better improvement of the maximum service temperature of the low-melting component.

The mixing proportions of PFA-C3 with PFA-C1 or PFA-C2 vary with the intended use, although the weight ratio is preferably from about 1/99 to about 99/1, and more preferably from about 10/90 to about 90/10. For example, when PFA-C3 is used as the high-melting component, by mixing it with up to about 40% by weight of PFA-C1 or PFA-C2 as the low-melting component, the flex life can be dramatically improved without undue sacrifice of the high heat deflection temperature of PFA-C3.

Various additives may be added to the inventive composition insofar as the objects of the invention are not defeated. Examples of such additives include ultraviolet absorbers, antistatic agents, pigments and inorganic fillers.

The inventive composition may be prepared using any ordinary method to mix the PFA-C3 with PFA-C1 and/or PFA-C2. Examples of suitable methods include mixing aqueous dispersions, mixing organic solvent-based dispersions, and melt blending. Mixing to achieve molecular miscibility occurs most readily when the viscosities of the component PFAs are identical or nearly so. The melt viscosities of the component polymers should not differ by more than about 5000 Pa·s, preferably not more than about 2000 Pa·s, more preferably not more than about 1500 Pa·s, and most preferably not more than about 1000 Pa·s. If more than two polymers are blended, the maximum viscosity difference, that is the difference between the two components that are farthest apart in viscosity, should not exceed the above values.

The mixing of aqueous dispersions is the preferred method.

EXAMPLES

Examples are given below by way of illustration. The methods used for evaluating physical properties in the examples and comparative examples are described below.

1. Measurement of Crystallization Temperature and Melting Point with a Differential Scanning Calorimeter:

A differential scanning calorimeter (DSC) is used for determining whether the melt processable fluoropolymer composition forms cocrystals and is therefore miscible in the crystalline region. The fluoropolymer composition is heated to a temperature at least 50° C. higher than the melting point of the high-melting component and held there for a time, for example held at 360° C. for 10 minutes, in order to completely melt the crystals. The composition is then cooled at a rate of 70° C./min and the crystallization temperature is determined as the minimum of the exothermic peak. After crystallization, the composition is heated at 10° C./min and the melting point is determined as the maximum of the endothermic peak. It will be recognized that this method uses the convention by which endothermic peaks are taken as descending to a minimum, exothermic peaks as rising to a maximum.

When a single crystallization temperature peak appears between the crystallization temperatures of the components and a single melting peak appears between the melting points of the components, the mixture is judged to be miscible in the crystalline region and to have formed cocrystals. Occasionally two melting peaks may appear in a specimen in which the PFA is crystallized after having first been melted. The small peak on the high-temperature side is attributable to molecular chains similar to PTFE, that is, PFA chains having a low PAVE content. In such cases, the larger peak is regarded as the melting point of the composition.

2. Measurement of α-Transition Temperature with Dynamic Mechanical Analyzer:

A Perkin Elmer Model 7e dynamic mechanical analyzer (DMA) is used for determining whether a melt processable fluoropolymer composition is miscible in the amorphous region. The general method for determining dynamic mechanical properties of plastics is given in ASTM D 4065–95. Standard terminology for the analysis is given in ASTM D 4092–96. A test specimen (3.5 mm wide, 8 mm long, 1.3 mm thick) is formed from the melt processable fluoropolymer composition, and the temperature dependence of tan δ is measured in the dynamic mechanical analyzer 3-point bending mode at a frequency of 1 Hz and a temperature rise rate of 5° C./min. Constant stress is applied. The amplitude of the bending is typically about 20 μm when the temperature is 15° C. The analysis is typically carried out over a temperature range of about 15° C. to 150° C. The α-transition temperature (the highest temperature transition) is determined as the peak temperature on the tan δ curve.

When a single α-transition temperature proportional to the blend ratio of copolymers in the composition appears between the α-transition temperatures for the two components, the mixture is considered to be miscible in the amorphous region. Because the α-transition temperature of PFA is regarded as similar to the glass-transition temperature of an ordinary polymer, the appearance of a single α-transition temperature proportional to the ratio of the mixture indicates that the components are mixed at the molecular level in the amorphous region.

Those skilled in the art will recognize that other temperature transitions, specifically the γ-transition, are sometimes referred to as glass-transition temperatures (see for example, S. V. Gangal in The Encyclopedia of Polymer Science and Engineering, vol. 16, p. 604; John Wiley and Sons, New York). However, the α-transition temperature is the higher of the two and is of greater interest when polymer use properties under normal conditions are being considered.

3. Flex Life:

A specimen (0.2 mm thick, 15 mm wide, 110 mm long) is compression molded from the melt processible fluoropolymer composition, and the flex life of the specimen is measured by the MIT method under a 1 kg load. The MIT method is described in ASTM D 2176. A Toyoseiki K. K. MIT Folding Endurance Machine is used.

4. Melt Flow Rate and Viscosity:

Melt flow rate (MFR) in units of g/10 minutes and, as disclosed herein, is determined according to the general method of ASTM D 1238, at 372° C. and under a 5 kg load. Melt viscosity (MV) in units Pa·s is calculated from the melt flow rate using Equation (1):

$$MV = 53150 \div MFR \quad (1)$$

5. Polymers:

The polymers used in the examples are commercial products where indicated. Otherwise, they are made according to the methods disclosed in U.S. Pat. No. 5,760,151.

EXAMPLES 1 TO 4, COMPARATIVE EXAMPLES 1 AND 2

Dispersions of PFA-C3 (PFA 345J, produced by DuPont-Mitsui Fluorochemicals Co., Ltd.; melt flow rate (MFR) 5 g/10 min; MV 10600 Pa·s, melting point 308° C.) containing 3.5% by weight of perfluoro(propyl vinyl ether) (PPVE) and of PFA-C2 (produced by DuPont-Mitsui Fluorochemicals Co., Ltd.; MFR 23 g/10 min, MV 2300 Pa·s, melting point 296° C.) containing 5.7% by weight of perfluoro(ethyl vinyl ether) (PEVE) are mixed in the proportions shown in Table 1, stirred and coagulated, then washed and dried to give a specimen. Specimens are also made in the same way from each of the starting materials. FIG. 1 shows the crystallization temperatures (Tc) of the components and the blends. Table 1 summarizes the crystallization temperature and the melting point measurements of the specimens.

As is apparent from FIG. 1 and Table 1, a single crystallization peak for the mixture appears between the crystallization temperatures of the two components (PFA-C3, 267° C.; PFA-C2, 250° C.) at a temperature proportional to the ratio of the components, and a single melting point proportional to the ratio appears between the melting points of the components (PFA-C3, 308° C.; PFA-C2, 296° C.) during the heating scan. Accordingly, it is concluded that the mixture is miscible in the crystalline regions and forms cocrystals. In Table 1, the melting point of the PFA-C3/PFA-C2=60/40 mixture (Example 2) is 305° C., which is about 9° C. higher than the melting point of the lower-melting component PFA-C2.

Using test pieces compression-molded from each of the above specimens, the α-transition temperature is measured with a dynamic mechanical analyzer. The results are summarized in Table 1. The PFA-C3/PFA-C2 mixtures exhibit a single α-transition temperature between the α-transition temperatures of the components and proportional to the ratio of components. This indicates that the composition is miscible in the amorphous regions. Furthermore, the maximum service temperature of the PFA-C2 is increased by the blending, and mechanical strength is maintained at temperatures greater than that of the PFA-C2 alone. The heat deflection temperature of the PFA-C2 is also increased by the blending. At the same time, the flex life of the blend is improved over that of PFA-C3 by itself.

TABLE 1

|  | Comp. Ex. 1 | Ex. 1 | Ex. 2 | Ex. 3 | Ex. 4 | Comp. Ex. 2 |
|---|---|---|---|---|---|---|
| PFA-C3 (wt %) (3.5 wt % PPVE) | 100 | 80 | 60 | 40 | 20 | 0 |
| PFA-C2 (wt %) (5.7 wt % PEVE) | 0 | 20 | 40 | 60 | 80 | 100 |
| Crystallization temperature (° C.) | 267 | 263 | 260 | 257 | 255 | 250 |
| Melting point (° C.) | 308 | 307 | 305 | 303 | 300 | 296 |
| α-Transition temperature (° C.) | 82 | 80 | 79 | 78 | 77 | 77 |

EXAMPLE 5

To investigate the crystallization rate dependence of the melting point, specimens prepared from the PFA-C3/PFA-C2=40/60 (by weight) mixture used in Example 3 are held at 360° C. for 10 minutes and the crystals completely melted, following which crystallization is induced at cooling rates of 5° C./min, 10° C./min, 20° C./min, and 70° C./min. The melting points are then measured at a heating rate of 10° C./min. The results are summarized in Table 2.

It is apparent from Table 2 that, over a broad range of cooling conditions, the 40/60 mixture exhibits a single melting point (about 304° C.) between the melting points of both components (PFA-C3, 308° C.; PFA-C2, 296° C.). Hence, the components of this blend cocrystallize regardless of the cooling conditions. The fact that cocrystals form whether cooling is rapid or gradual means that a uniform and intimate mixture can easily be formed in ordinary melt fabrication processes. Extraordinary care need not be taken to ensure that phase separation of the components does not occur under certain cooling conditions.

TABLE 2

|  | Example 5 |
|---|---|
| PFA-C3 (wt %) - (PPVE content, 3.5 wt %) | 40 |
| PFA-C2 (wt %) - (PEVE content, 5.7 wt %) | 60 |
| Melting point (° C.) (cooling rate, 5° C./min) | 305 |
| Melting point (° C.) (cooling rate, 10° C./min) | 304 |

TABLE 2-continued

|  | Example 5 |
|---|---|
| Melting point (° C.) (cooling rate, 20° C./min) | 304 |
| Melting point (° C.) (cooling rate, 70° C./min) | 303 |

EXAMPLE 6

Figure 2:
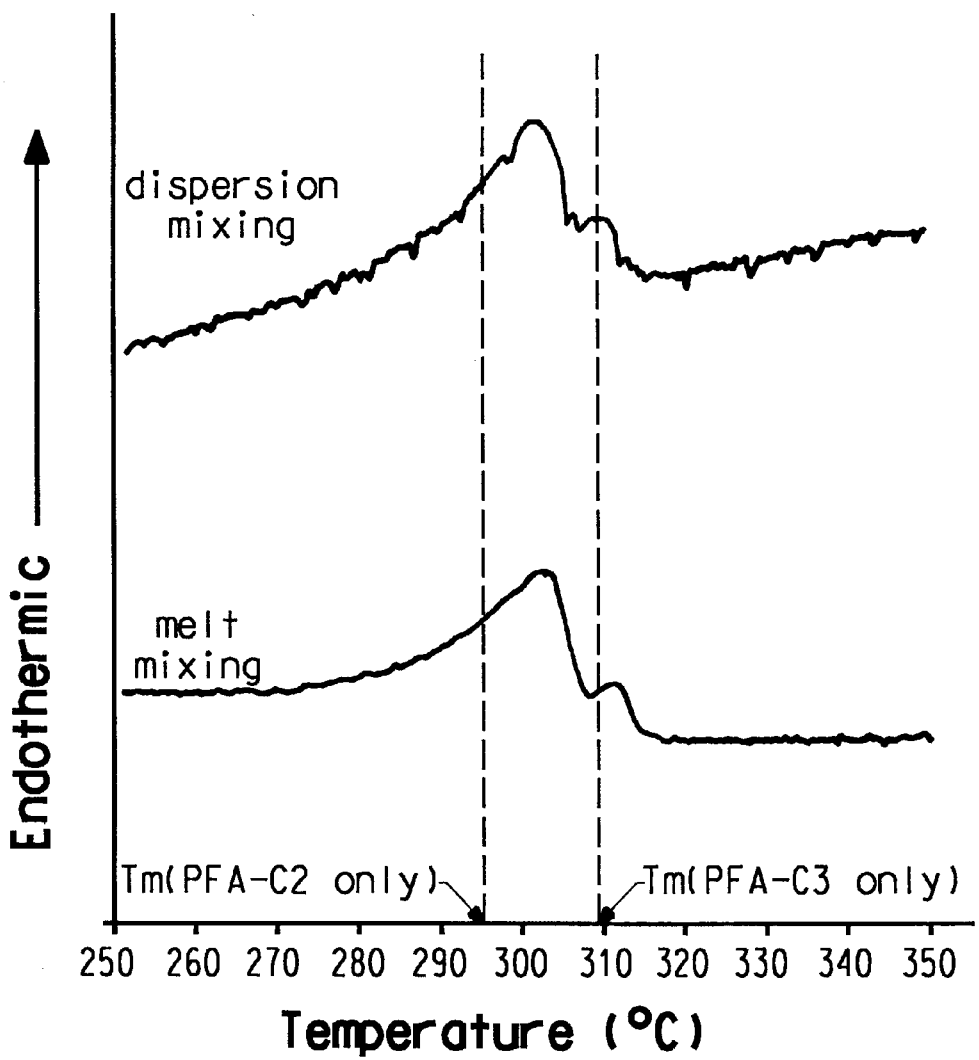
FIG. 2 is a graph showing the independence of the melting point (Tm) of a 40/60 PFA-C3/PFA-C2 blend of the method by which the blend is mixed. The vertical broken lines mark the melting points of the PFA-C2 and PFA-C3 components. The heating rate is 10° C./minute.

To determine if miscibility is affected by the blending method, melt blending is carried out with an R-60 internal melt kneader (manufactured by Toyo Seiki Seisaku-sho Co., Ltd.) using the polymers described in Examples 1 to4, in the same weight ratio (40/60) as in Example 3. FIG. 2 summarizes the results obtained by DSC measurements of the resulting composition carried out in the same fashion as in Example 3. For comparison, the dispersion-mixing results from Example 3 are included.

As is apparent from FIG. 2, only one melting point (Tm) appears between the melting points of the components PFA-C3 and PFA-C2. This shows that the melt blend exists in a uniform, intimately mixed state, and the melting point in this case is essentially the same as that of a dispersion mixture of the same composition. Thus, it is apparent that the PFA-C3 and PFA-C2 cocrystallize regardless of mixing methods. A small melting peak appears near 310° C. on the melting curve, but, as is stated above, this arises from the melting of PFA-C3 chains having a low PAVE content. Because a small melting peak is also seen near 310° C. after the crystallization of pure PFA-C3, this peak is clearly not the melting peak of the cocrystal. The large peak near 303° C. is the melting peak of the cocrystal.

This example demonstrates that the compositions of this invention do not require special mixing means for their production. Standard mixing methods are acceptable.

EXAMPLES 7 TO 10, COMPARATIVE EXAMPLE 3

Specimens of PFA-C3/PFA-C2 mixtures are prepared by the dispersion mixing process in the same manner as in Examples 1 to 4 except that a copolymer (manufactured by DuPont-Mitsui Fluorochemicals, Co., Ltd.; MFR 9.7 g/10 min, MV 5700 Pa·s) containing 13.3% by weight of PEVE is used as PFA-C2. Melting point measurements (DSC) and α-transition temperature measurements (DMA) are carried out on the resulting compositions. The same measurements are also carried out on the PFA-C2 alone. The results are summarized in Table 3.

As is apparent from Table 3, unlike the results obtained in Examples 1 to 4 using PFA-C2 containing 5.7% by weight of PEVE, two melting points (PFA-C3: near 308° C.; PFA-C2: near 254° C.) corresponding to the melting points of the respective components are observed in these mixtures. Also, because the specimen composed solely of PFA-C2 has a high PEVE, the melting point is low and the degree of crystallinity is low. As a result, because the melting point difference between the two components is about 54° C. and the crystallization temperature difference is about 45° C., during crystallization of the mixture the higher melting component PFA-C3 crystallizes first, after which the PFA-C2 solidifies within the already formed matrix of solid PFA-C3. In mixtures having a PFA-C3 content of 60% or more, crystallization of the PFA-C2 is hindered, and no melting peak for PFA-C2 appears.

In the other PFA-C3/PFA-C2 mixtures in these examples, because of the wide difference in the crystallization temperatures of the components and the high PAVE content of PFA-C2, the high-melting component PFA-C3 crystallizes first, resulting in phase separation between the crystal phases of the components, and the appearance of two melting points, which correspond to the melting points of the components. Therefore, the above blend is not miscible in the crystalline regions. However, a single α-transition temperature appears at a point between the α-transition temperatures of the two components and proportional to the composition, indicating miscibility in the amorphous regions. The heat deflection temperature of the PFA-C2 is increased by the blending.

TABLE 3

|  | Comp. Ex. 1 | Ex. 7 | Ex. 8 | Ex. 9 | Ex. 10 | Comp. Ex. 3 |
|---|---|---|---|---|---|---|
| PFA-C3 (wt %) - (3.5 wt % PPVE) | 100 | 80 | 60 | 40 | 20 | 0 |
| PFA-C2 (wt %) - (13.3 wt % PEVE) | 0 | 20 | 40 | 60 | 80 | 100 |
| PFA-C3 melting point (° C.) High temperature side | 308 | 307 | 307 | 307 | 306 | — |
| PFA-C2 melting point (° C.) Low temperature side | — | no peak | no peak | 251 | 253 | 254 |
| α-Transition temp. (° C.) | 82 | 77 | 68 | 65 | 61 | 61 |

EXAMPLES 11 TO 15, COMPARATIVE EXAMPLE 4

PFA-C3 (PFA 340J, from DuPont-Mitsui Fluorochemicals Co., Ltd.; MFR 13.0 g/10 min, MV 4100 Pa·s) containing 3.9% by weight of PPVE and PFA-C2 (DuPont-Mitsui Fluorochemicals Co., Ltd.; MFR 14.3 g/10 min, MV 3700 Pa·s) containing 6.7% by weight of PEVE, or PFA-C2 (DuPont-Mitsui Fluorochemicals Co., Ltd.; MFR 10.1 g/10 min, MV 5250 Pa·s) containing 14.5% of PEVE are melted and mixed by the same method as in Example 6 and in the mixing ratios shown in Table 4. Test pieces compression-molded from the resulting mixtures are subjected to flex life measurements by the MIT method. Because flex life is strongly dependent upon molecular weight (or MFR), components having similar melt flow rates are selected for these examples. The flex lives of test pieces composed only of PFA-C3 are also measured. The results are summarized in Table 4.

As is apparent from Table 4, the flex life of PFA-C3 is improved by admixture of PFA-C2. Moreover, at the same ratios, the use of PFA-C2 having a higher PEVE content increases the relative proportion of the amorphous region, thereby increasing the flex life. That is, PFA-C2 with higher PEVE is a more effective blend component. The blends of Examples 11 to 13, which are miscible in both the amorphous and the crystalline regions, exhibit increased deflection temperature and maintain their mechanical properties to higher temperatures compared to PFA-C2. Examples 14 and 15, which are miscible in the amorphous regions but not in the crystalline regions, exhibit increased deflection temperature compared to PFA-C2.

TABLE 4

| | Comp. Ex. 4 | Ex. 11 | Ex. 12 | Ex. 13 | Ex. 14 | Ex. 15 |
|---|---|---|---|---|---|---|
| PFA-C3 (wt %) - (3.9 wt % PPVE) | 100 | 90 | 80 | 70 | 90 | 80 |
| PFA-C2 (wt %) - (6.7 wt % PEVE) | 0 | 10 | 20 | 30 | | |
| PFA-C2 (wt %) - (14.5 wt % PEVE) | | | | | 10 | 20 |
| Flex life (cycles) | 29,000 | 32,000 | 42,000 | 55,000 | 76,000 | 120,000 |

Because they are miscible in amorphous regions, the melt processable fluoropolymer compositions according to the present invention have desirable properties, including enhanced mechanical properties such as flex life, and lower permeability to gases and chemicals. Moreover, by suitably selecting the constituent components, there can be obtained compositions that will cocrystallize after conventional melt fabrication, regardless of the cooling conditions and mixing method. The cocrystallized composition thus obtained will have a melting point situated between the melting point of the lower-melting PFA and the melting point of the higher-melting PFA. Accordingly, this is an effective means for improving the maximum service temperature of the lower-melting component while taking advantage of its contribution to product properties, such as improved flex life.

What is claimed is:

1. A melt processable fluoropolymer composition comprising:
   a) a first copolymer of tetrafluoroethylene and perfluoro(alkyl vinyl ether) wherein the alkyl group of the perfluoro(alkyl vinyl ether) has at least 3 carbons, and
   b) a second copolymer of tetrafluoroethylene and perfluoro(alkyl vinyl ether) wherein the alkyl group of the perfluoro(alkyl vinyl ether) has 1 and/or 2 carbons, wherein each said first copolymer and said second copolymer has crystalline and amorphous regions, at least the amorphous regions of said first copolymer and second copolymer being miscible with one another as revealed by said composition exhibiting a single α-transition temperature.

2. The melt processable fluoropolymer composition of claim 1, wherein said first copolymer has a perfluoro(alkyl vinyl ether) content within a range of about 0.5 to about 8% by weight, and said second copolymer has a perfluoro(alkyl vinyl ether) content within a range of about 1 to about 25% by weight.

3. The melt processable fluoropolymer composition of claim 1, wherein the ratio of said first copolymer to said second copolymer is from about 1:99 to about 99:1.

4. The melt processable fluoropolymer composition of claim 1, wherein the ratio of said first copolymer to said second copolymer is from about 10:90 to about 90:10.

5. The melt processable fluoropolymer composition of claim 1 which exhibits only one crystallization temperature and one melting point, as determined using a differential scanning calorimeter.

6. The melt processable fluoropolymer composition of claim 1 wherein the maximum viscosity difference of the component polymers does not exceed 2000 Pa·s.

7. The melt processable fluoropolymer composition of claim 1 wherein the maximum viscosity difference of the component polymers does not exceed 1500 Pa·s.

8. The melt processable fluoropolymer composition of claim 1 wherein the maximum viscosity difference of the component polymers does not exceed 1000 Pa·s.

* * * * *